(12) United States Patent
Nakano et al.

(10) Patent No.: US 8,553,309 B2
(45) Date of Patent: Oct. 8, 2013

(54) BLADE SPEED ADJUSTABLE MECHANISM AND FOCAL PLANE SHUTTER HAVING THE SAME

(75) Inventors: Yoichi Nakano, Chiba (JP); Hiroshi Takahashi, Chiba (JP)

(73) Assignee: Seiko Precision Inc., Narashino-Shi (JP)

( * ) Notice: Subject to any disclaimer, the term of this patent is extended or adjusted under 35 U.S.C. 154(b) by 197 days.

(21) Appl. No.: 13/010,201

(22) Filed: Jan. 20, 2011

(65) Prior Publication Data

US 2011/0116149 A1    May 19, 2011

Related U.S. Application Data

(63) Continuation of application No. PCT/JP2009/063048, filed on Jul. 21, 2009.

(30) Foreign Application Priority Data

Aug. 11, 2008  (JP) ................... 2008-206578

(51) Int. Cl.
  *G02B 26/02*  (2006.01)
(52) U.S. Cl.
  USPC .......................................... 359/227; 396/452
(58) Field of Classification Search
  None
  See application file for complete search history.

(56) References Cited

U.S. PATENT DOCUMENTS 2,887,936 A * 5/1959 Spievak ................... 396/552
3,007,369 A * 11/1961 Squassoni et al. ......... 355/43
3,533,346 A * 10/1970 Erlichman et al. ........... 396/443
2007/0253707 A1* 11/2007 Yoshida et al. ............... 396/489
2009/0317072 A1* 12/2009 Takahashi et al. ........... 396/502

FOREIGN PATENT DOCUMENTS

| JP | 2-242310 | 9/1990 |
|---|---|---|
| JP | 10-239730 | 9/1998 |
| JP | 2003-66508 A1 | 3/2003 |

OTHER PUBLICATIONS

International Search Report for International Application No. PCT/JP2009/063048 dated Aug. 11, 2009.
Notification of Submission of Opinion received in counterpart application No. 10-2011-7001966 mailed Apr. 24, 2012 from the Korean Intellectual Property Office with English translation (9 pages).
Office Action issued on Oct. 17, 2011 in corresponding Chinese Patent Application No. 200980130913.2 with English translation.

* cited by examiner

*Primary Examiner* — Jennifer L. Doak
*Assistant Examiner* — James McGee
(74) *Attorney, Agent, or Firm* — Kratz, Quintos & Hanson, LLP

(57) ABSTRACT

A blade speed adjustable mechanism includes: a board having an opening; a shutter blade opening or closing the opening; a drive lever supported by the board and bringing the shutter blade into an overlapped operation or an expanded operation; a biasing member engaging the drive lever and biasing the shutter blade in an overlapped direction or in an expanded direction; a ratchet member engaging the biasing member and having ratchet teeth; an engagement member holding the ratchet member at a desired stop position and adjusting an biasing force of the biasing member by changing the stop position. The engagement member has a plurality of pawl portions different from each other in length. The pawl portion engages the ratchet tooth to hold the ratchet member at the stop position. A difference in length between the pawl portions is shorter than a distance corresponding to a pitch of the ratchet teeth.

4 Claims, 9 Drawing Sheets

BLADE SPEED ADJUSTABLE MECHANISM AND FOCAL PLANE SHUTTER HAVING THE SAME

CROSS-REFERENCE TO RELATED APPLICATION

This application is a continuation of and claims priority to International Patent Application No. PCT/JP2009/063048 filed on Jul. 21, 2009, which claims priority to Japanese Patent Application No. 2008-206578 filed on Aug. 11, 2008, subject matter of these patent documents is incorporated by reference herein in its entirety.

BACKGROUND (i) Technical Field

The present invention relates to shutter blade speed adjustable mechanisms that change the amount of drive force of a biasing member for driving a shutter blade to adjust the running speed of the shutter blade, and focal plane shutters that have the same.

(ii) Related Art

There is conventionally known a focal plane shutter which is employed in an optical device. The focal plane shutter uses a ratchet member and an engagement member, which has a pawl portion engaging a ratchet teeth of the ratchet member, in order to adjust the running speed of leading and trailing blades (for example, see Japanese Unexamined Patent Application Publication No. 2003-66508). Shutter blades, which configure the leading and trailing blades, are pivotally supported by two arms pivotally attached in a board having an opening so as to be aligned in lengthwise directions of two arms. The leading and trailing blades are overlapped and expanded by the rotation of a drive lever (opening or closing lever) which engages the arm and is pivotally supported by the board.

Further, each of the leading and trailing blades is provided with a drive spring serving as a biasing member. The biasing force of the drive spring is used as a drive source for the shutter blade. Here, there is provided the ratchet member having the ratchet teeth and the engagement member holding the ratchet member in a given position to adjust the running speed by changing the biasing force of the drive spring.

The adjustment of the running speed of the shutter blade in the focal plan shutter is generally configured as follows. The drive spring serving as the biasing member is provided between the drive lever and the ratchet member. The ratchet member is held by engaging the pawl portion of the engagement member with the ratchet teeth. Here, changing the engagement relationship between the pawl portion of the engagement member and the ratchet teeth, beforehand, causes the ratchet member to change its stop position, thereby changing the attachment state of the biasing member. Accordingly, the biasing force of the drive spring is changeable. That is, by adjusting the engagement relationship between the pawl portion and the ratchet teeth before the operation of the shutter, the running speed of the shutter blade is adjustable. Further, the pawl portion of the engagement member is composed of plural pawls, which are engaged with plural ratchet members different in phase from each other, thereby controlling the running speed of the shutter blade by finely arranged steps.

Additionally, there has been implemented a shutter blade speed adjustable mechanism which gradually adjusts the biasing force of the spring with a worm mechanism to gradually control the running speed of a shutter blade.

In such a blade speed adjustable mechanism, the plural pawl portions of the engagement member, which engages the ratchet teeth to hold the ratchet member, are similar to each other in length so as to engage the plural ratchet teeth, which are different in phase from each other.

However, in order to increase the number of the steps of speed adjustment in such conventional configurations, it is conceivable to reduce a pitch distance of the ratchet teeth without increasing the number of the pawl portions of the engagement portion. Alternately, it is conceivable to increase the number of the pawl portions of the engagement portion and the types of the ratchet portions, which are different in phase from each other, to respectively engage the pawl portions with the ratchet teeth.

As a result, when the pitch is made small without increasing the number of the pawl portions of the engagement member, grooves, which are capable of engaging the pawl portion, of the ratchet portion are made shallow. This arises a problem that the ratchet member is not held with certainty. Further, when the number of the pawl portions of the engagement member is increased and the pawl portions respectively engage the ratchet teeth different in phase from each other, the thickness of the ratchet teeth is increased in its rotational axis direction, so that large space is needed for the increase.

Additionally, a blade speed adjustment mechanism using a worm mechanism has a problem of reducing its size and cost, in comparison to the blade speed adjustment mechanism using the ratchet member.

SUMMARY

It is therefore an object of the present invention to provide a blade speed adjustable mechanism finely adjusting a shutter blade speed with certainty and keeping its small size at low cost and a focal plane shutter having the same.

According to an aspect of the present invention, there is provided a blade speed adjustable mechanism of a focal plane shutter, the mechanism including: a board having an opening; a shutter blade opening or closing the opening; a drive lever supported by the board and bringing the shutter blade into an overlapped operation or an expanded operation; a biasing member engaging the drive lever and biasing the shutter blade in an overlapped direction or in an expanded direction; a ratchet member engaging the biasing member and having ratchet teeth; an engagement member holding the ratchet member at a desired stop position and adjusting an biasing force of the biasing member by changing the stop position, wherein: the engagement member has a plurality of pawl portions different from each other in length; the pawl portion engages the ratchet tooth to hold the ratchet member at the stop position; and a difference in length between the pawl portions is shorter than a distance corresponding to a pitch of the ratchet teeth.

DETAILED DESCRIPTION

In the following, a description will be given, with reference to the drawings, of a focal plane shutter including a blade speed adjustment mechanism according to the present invention.

[First Embodiment]

In the following, a description will be given, with reference to the drawings, of a focal plane shutter 1 including a blade speed adjustment mechanism according to the first embodiment of the present invention.

Figure 1:
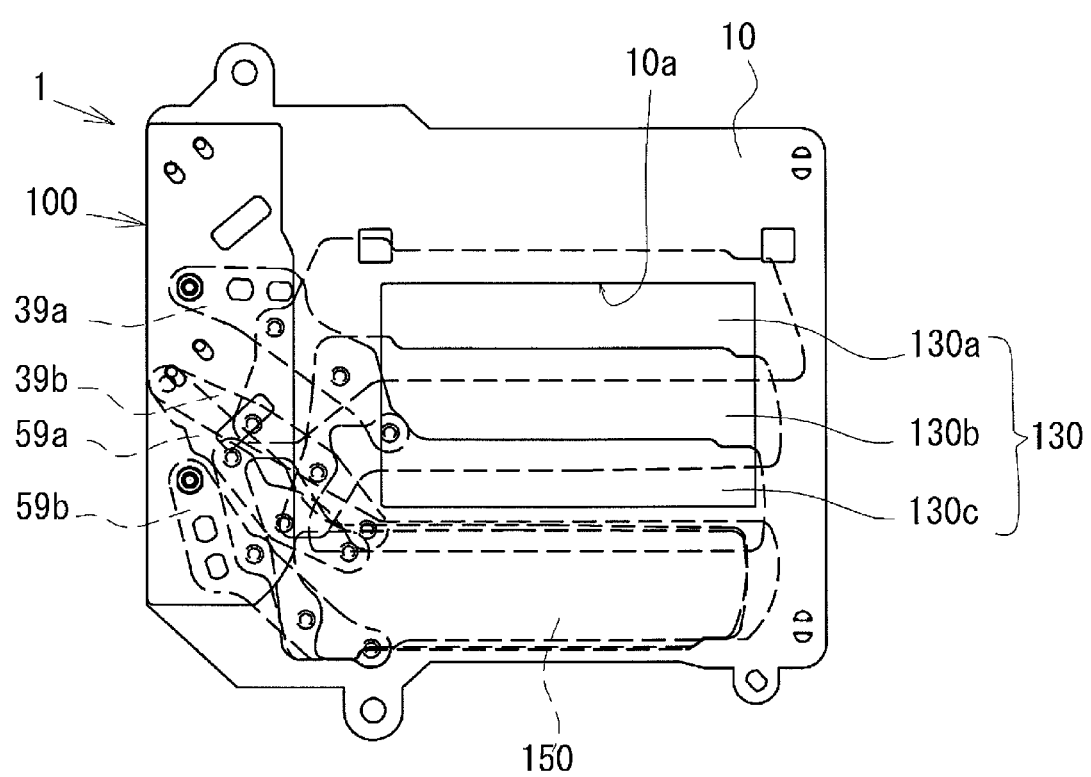
FIG. 1 is a front view of a focal plane shutter.

FIG. 1 is a front view of the focal plane shutter 1 according to the first embodiment of the present invention. Additionally, FIG. 1 illustrates an expanded state of a leading blade and an overlapped state of a trailing blade. The focal plane shutter 1 includes a shutter board 10, the leading blade 130, the trailing blade 150 and a shutter drive mechanism 100. The shutter board 10 is provided with an opening 10a. The shutter drive mechanism 100 is provided on the shutter board 10 at the left side of the opening 10a. The leading blade 130 is composed of three blades 130a to 130c. Likewise, the trailing blade 150 is composed of three blades.

The leading blade 130 is connected to arm members 39a and 39b so as to be driven from the expanded state to the overlapped state by the operation of the arm members 39a and 39b. Specifically, each proximate end portion of blades 130a to 130c is connected to the arm members 39a and 39b with a caulking pin. Like the leading blade 130, the trailing blade 150 is connected to arm members 59a and 59b so as to be driven from the overlapped state to the expanded state. Each proximate end portion of blades of the trailing blade 150 is connected to the arm members 59a and 59b with a caulking pin.

Figure 2:
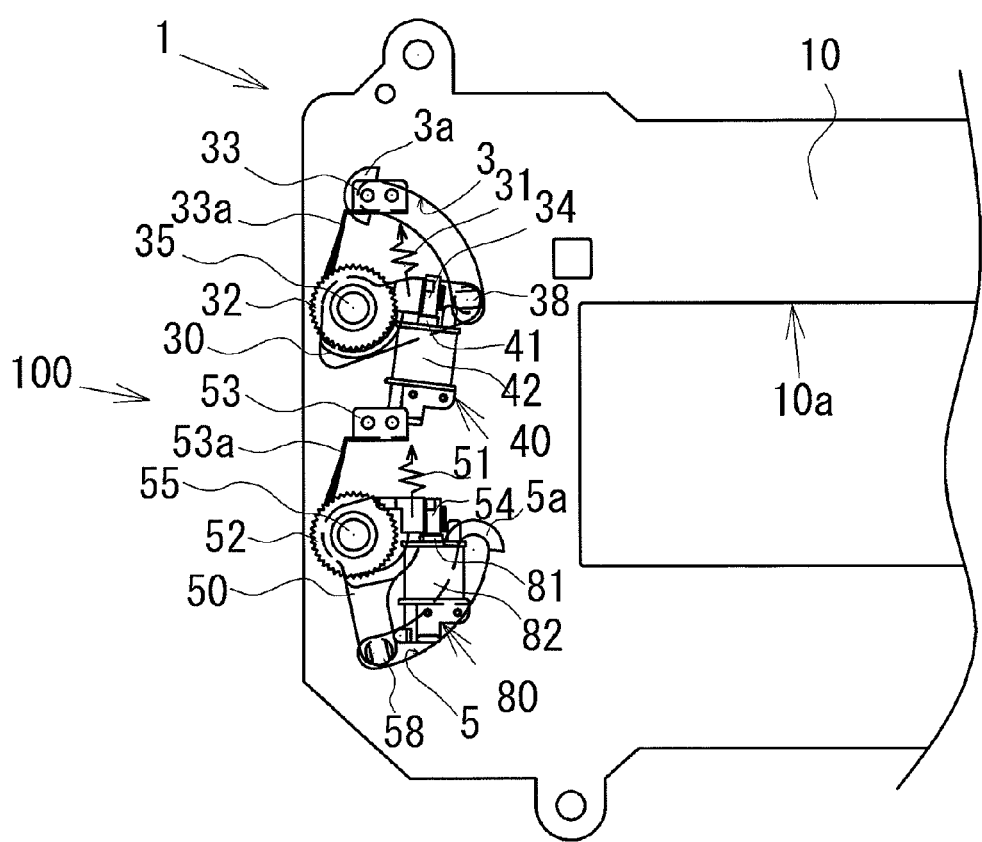
FIG. 2 is a partially enlarged view of the focal plane shutter before the shutter operation.
Figure 3:
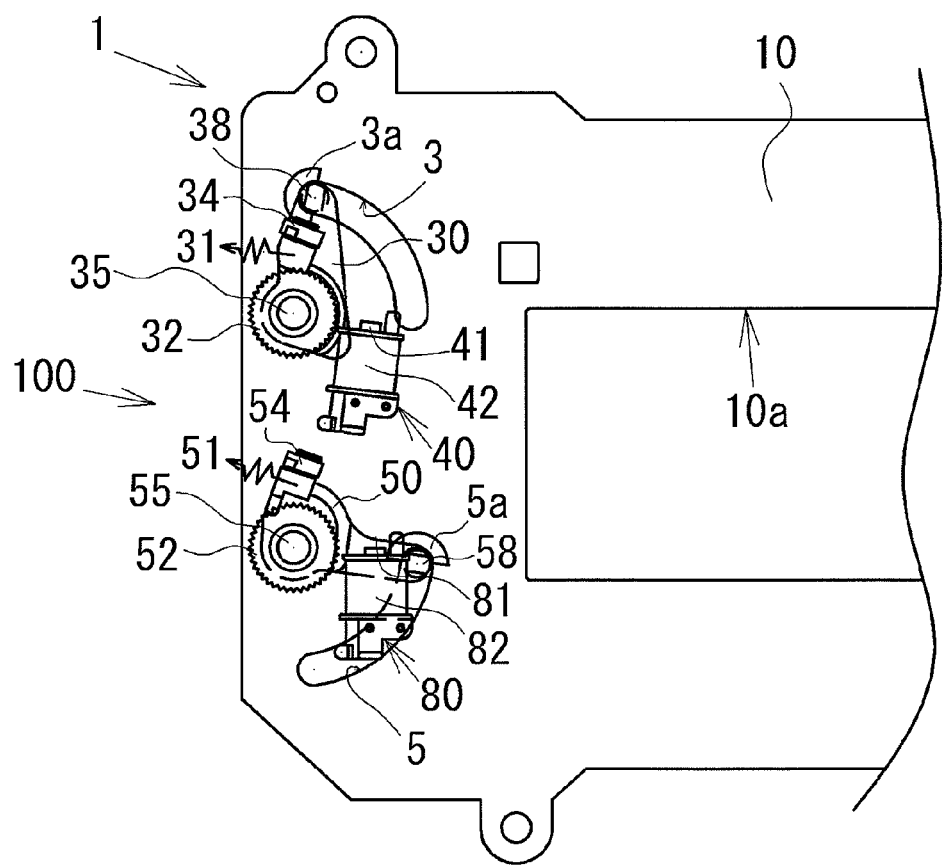
FIG. 3 is a partially enlarged view of the focal plane shutter after the shutter operation.

FIGS. 2 and 3 are expanded views of the shutter drive mechanism 100 of the focal plane shutter 1. FIG. 2 is a partially enlarged view of a set state before a shutter operation. FIG. 3 is a partially enlarged view of a state after the shutter operation. The shutter drive mechanism 100 includes an opening lever 30, electromagnets 40 and 80, a closing lever 50, and a blade speed adjustable mechanism 2a mentioned later. Additionally, in FIGS. 2 and 3, parts of the shutter drive mechanism 100, the arm members 39a and 39b, the leading blade 130, and the like will be omitted.

As illustrated at the upper sides in FIGS. 2 and 3, the opening lever 30 is rotatably supported with a rotational shaft 35 provided on the shutter board 10. The opening lever 30 engages one end of a biasing member 31 to be biased counterclockwise about the rotational shaft 35, and the biasing member 31 has the biasing force serving as a drive source for the opening lever 30. The opening lever 30 is restricted from rotating counterclockwise by the electromagnet 40 mentioned later. In the present embodiment, the biasing member 31 is a torsion coil spring. Further, as illustrated in FIG. 2, a ratchet member 32 is rotatably supported with the rotational shaft 35, and an engagement member 33 is secured to a printed-wiring board 36 provided in the shutter drive mechanism 100 by a known securing method. Here, the ratchet member 32 engages the other end of the biasing member 31 to be biased clockwise about the rotational shaft 35. The ratchet member 32 is restricted from rotating clockwise by engaging ratchet teeth 32a, provided on an outer peripheral surface thereof, with a pawl portion 33a of the engagement member 33.

The opening lever 30 is integrally provided at its back surface side with a drive pin 38. An opening lever escape hole 3 is provided in the shutter board 10 at the region where the drive pin 38 rotates, and has an arc shape. A rubber member 3a, which abuts the drive pin 38 to restrict the rotational range of the opening lever 30, is provided at the terminal end position of the opening lever escape hole 3. Further, the opening lever 30 is connected to the arm members 39a and 39b, and is driven to drive the leading blade 130.

Likewise, at the lower sides in FIGS. 2 and 3, the closing lever 50 is rotatably supported with a rotational shaft 55 provided on the shutter board 10. The closing lever 50 engages one end of a biasing member 51, which has the biasing force serving as a drive source for the closing lever 50, to be biased counterclockwise about the rotational shaft 55. The closing lever 50 is restricted from rotating counterclockwise by the electromagnet 80 mentioned later. Here, the biasing member 51 is a torsion coil spring. Further, as illustrated in FIG. 2, a ratchet member 52 is rotatably supported with the rotational shaft 55, and an engagement member 53 is secured to the printed-wiring board 36 provided in the shutter drive mechanism 100 by a known securing method. Here, the ratchet member 52 engages the other end of the biasing member 51, and is biased clockwise about the rotational shaft 55. The ratchet member 52 is restricted from rotating clockwise by engaging ratchet teeth, which is provided on an outer peripheral surface thereof, with a pawl portion 53a of the engagement member 53. Further, the engagement members 33 and 53 are omitted in FIG. 3.

The closing lever 50 is integrally provided at its end of the back surface side with a drive pin 58. A closing lever escape hole 5 is provided in the shutter board 10 at the region where the drive pin 58 rotates, and has an arc shape. A rubber member 5a, which abuts the drive pin 58 to restrict the rotational range of the closing lever 50, is provided at the terminal end position of the closing lever escape hole 5. Further, the closing lever 50 is connected to the arm members 59a and 59b, and is driven to drive the trailing blade 150.

Moreover, as illustrated in FIGS. 2 and 3, the shutter drive mechanism 100 is provided with the electromagnets 40 and 80. The electromagnets 40 and 80 retain the leading and trailing blades 130 and 150 at the predetermined positions, respectively. Specifically, the electromagnet 40 includes an iron core 41, and a coil 42 wound around the iron core 41. The iron core 41 is excited by energizing the coil 42. When the iron core 41 is excited, an iron piece 34 provided in the opening lever 30 is adsorbed to the iron core 41. Therefore, the electromagnet 40 holds the leading blade 130 at a predetermined position. Likewise, an iron piece 54 provided in the closing lever 50 is adsorbed to an iron core 81 by energizing a coil 82, and the electromagnet 80 holds the trailing blade 150 at a predetermined position.

A set lever, not illustrated, is provided at a position close to the middle of FIGS. 2 and 3. This set lever positions the opening and closing levers 30 and 50 at each of the set positions. When the shutter release is operated in the state as illustrated in FIG. 2, the shutter operation starts.

Next, a description will be given of the blade speed adjustable mechanism 2a according to the present embodiment.

Figure 4:
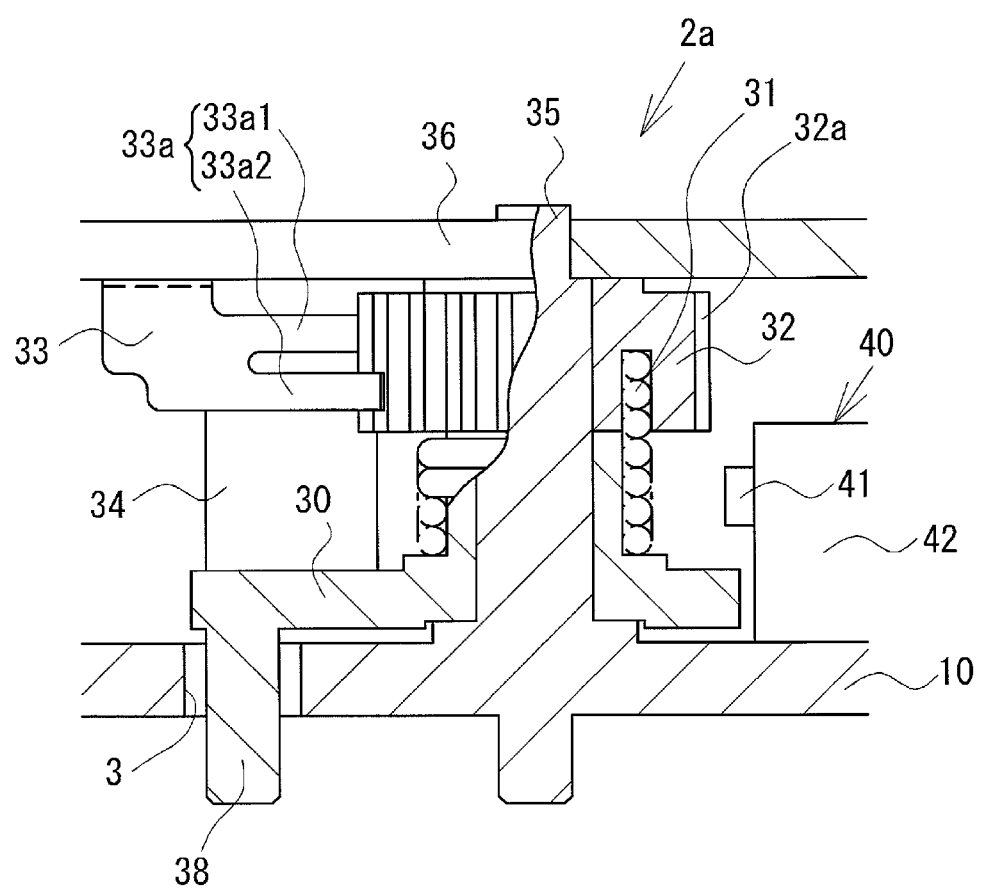
FIG. 4 is a side view of a blade speed adjustable mechanism of the focal plane shutter.
Figure 5:
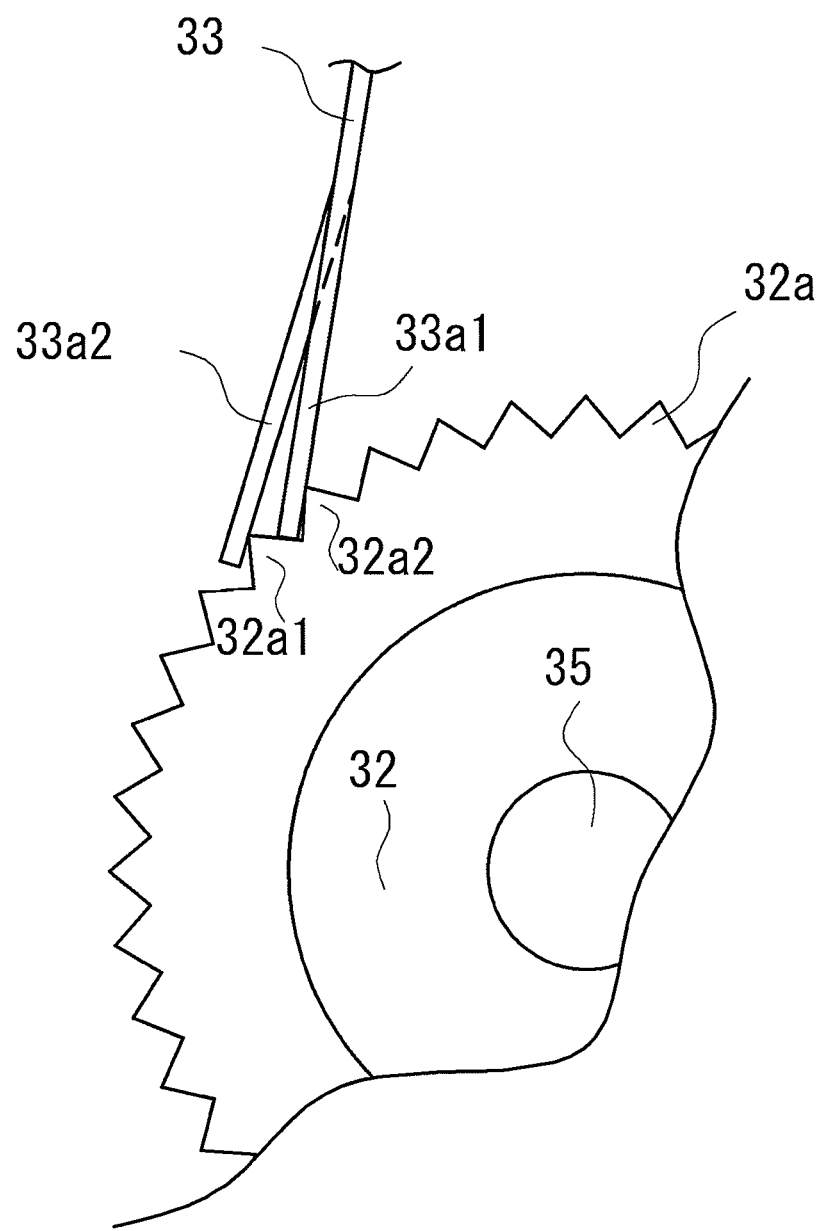
FIG. 5 is a partially enlarged view of the blade speed adjustable mechanism in an engagement state between a ratchet member and an engagement member.
Figure 6A:
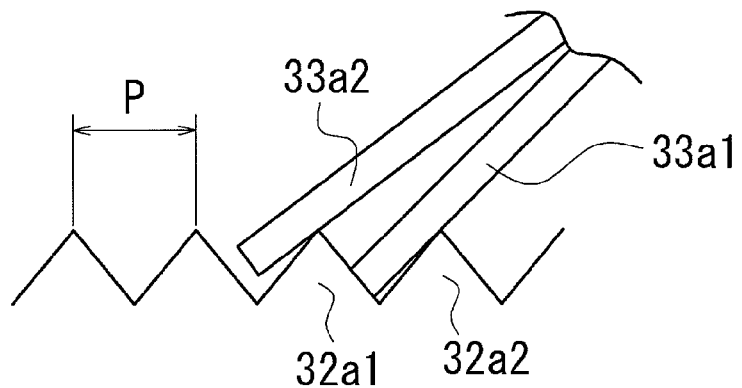
FIGS. 6A to 6C are schematic views of the engagement state between ratchet teeth of the ratchet member and pawl portions of the engagement member.
Figure 6B:
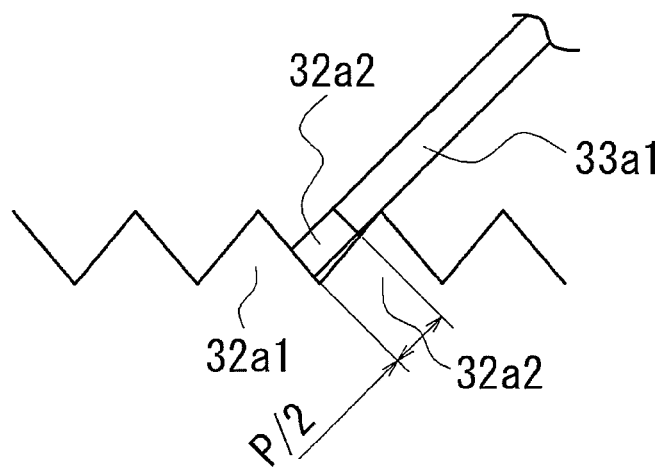
Figure 6C:
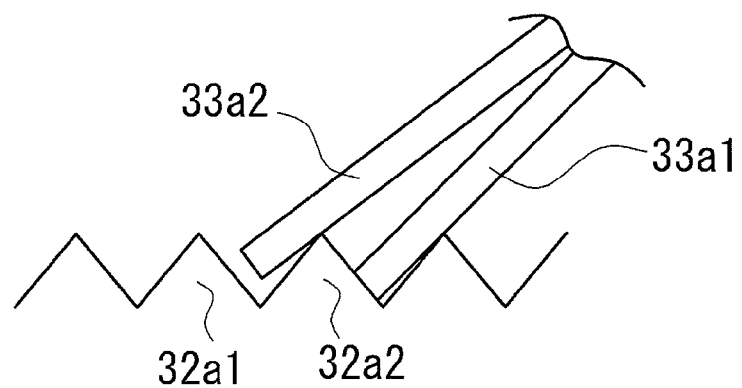

FIG. 4 is a side view of the blade speed adjustable mechanism 2a of the focal plane shutter 1 in the vicinity of the opening lever 30. FIG. 5 is a partially enlarged view of the blade speed adjustable mechanism 2a in an engagement state between the ratchet teeth 32a of the ratchet member 32 and the pawl portion 33a of the engagement member 33. FIGS. 6A to 6C are exemplary views of the engagement state between the ratchet teeth 32a and the pawl portion 33a. Additionally, the blade speed adjustment mechanism is also provided in closing lever 50 side, that is, for adjusting the blade speed of the trailing blade 150. Its description will be omitted because its components are same with those of the blade speed adjustable mechanism 2a provided in opening lever 30 side, that is, for adjusting the blade speed of the leading blade 130.

As illustrated in FIG. 4, the ratchet teeth 32a are provided at the outer peripheral surface of the ratchet member 32 which is used in the blade speed adjustable mechanism 2a according to the present embodiment. In FIG. 5, a tooth portion 32a1 of the ratchet teeth 32a engages a pawl portion 33a1 of the engagement member 33, so that the rotation of the ratchet member 32 due to the biasing force of the biasing member 31 is restricted to hold the ratchet member 32 at the predetermined position, as mentioned above. This engagement state is illustrated in FIG. 6A. When the ratchet member 32 is rotated counterclockwise from this state against the biasing force of the biasing member 31 by a distance corresponding to a half pitch of the teeth portion of the ratchet teeth of the ratchet member 32, the tooth portion 32a1 engages a pawl portion 33a2 to hold the ratchet member 32 as illustrated in FIG. 6B. In the blade speed adjustable mechanism 2a according to the present embodiment, the difference in length between the pawl portions 33a1 and 33a2 is shorter than the pitch distance between the teeth portion of the ratchet teeth 32a, specifically, by a length corresponding to a half pitch. For this reason, the pawl portion 33a2, which is longer than the pawl portion 33a1, is delayed by the half pitch to engage the tooth portion 32a1 of the ratchet teeth 32a. Likewise, when the ratchet member 32 is rotated counterclockwise against the biasing force of the biasing member 31 by the distance corresponding to the half pitch of the teeth portion of the ratchet teeth, a tooth portion 32a2 engages the pawl portion 33a1 to hold the ratchet member 32 as illustrated in FIG. 6C.

As mentioned in FIGS. 2 and 3, the opening lever 30 is biased counterclockwise by engaging one end of the biasing member 31, and is restricted from rotating counterclockwise by the electromagnet 40. Additionally, the ratchet member 32 is biased clockwise by engaging the other end of the biasing member 31, and is restricted from rotating clockwise by the ratchet member 32. Thus, to increase the biasing force of the biasing member 31, the ratchet member 32 is rotated counterclockwise against the biasing force of the biasing member 31. In contrast, to decrease the biasing force of the biasing member 31, the pawl portion 33a of the engagement member 33 is disengaged with the ratchet teeth 32a by use of an adjusting tool or the like to rotate the ratchet member 32 clockwise.

In this manner, the stop position of the ratchet member is adjusted, and the engagement state between the engagement member 33 and the ratchet member 32 is changed, thereby adjusting the biasing force of the biasing member 31. That is, the ratchet member is rotated before the shutter operation to change the attachment position, with respect to the opening lever 30, of the other end of the torsion coil spring of the biasing member 31, thereby adjusting the blade speed of the leading blade 130.

In this way, in the blade speed adjustable mechanism 2a according to the present embodiment, the engagement member 33 has the plural pawl portions 33a1 and 33a2 different from each other in length. The pawl portions 33a1 and 33a2 engage the ratchet teeth 32a to hold the ratchet member in the stop position, thereby finely adjusting the biasing force of the biasing member 31. This enables the blade speed to be finely adjusted. These arrangements prevent the problem that grooves of the ratchet teeth engaging the pawl portions are made shallower and the ratchet member is not held with certainty, the problem being caused in a case where the pitch of the ratchet teeth 32a is made smaller and the number of the adjustment positions is made to have the same number thereof without increasing the number of the engagement member 33. Further, as compared with a blade speed adjustment mechanism using a worm mechanism, the blade speed can be finely adjusted with reduced space and at low cost because the worm member is not used.

Next, a description will be given of the shutter operation of the blade speed adjustable mechanism 1 according to the present embodiment. When the shutter release is operated in the state illustrated in FIG. 2, the coils 42 and 82 are firstly energized to excite the iron cores 41 and 81, respectively. Accordingly, the iron piece 34 of the opening lever 30 and the iron piece 54 of the closing lever 50 are adsorbed to the iron cores 41 and 81, respectively. In this state, the set lever moves away from the rotational regions of the opening lever 30 and closing lever 50.

Then, the energization of the coil 42 is cut to demagnetize the iron core 41. Therefore, the opening lever 30 is rotated counterclockwise by the biasing force of the biasing member 31 adjusted as mentioned above, so that the leading blade connected to the opening lever 30 moves toward the upper portion, thereby opening the opening 10a. When the opening lever 30 is rotated, the drive pin 38 abuts the rubber member 3a located at the terminal end position of the opening lever escape hole 3 to finish driving the opening lever 30.

Next, after a desirable exposure period, the energization of the coil 82 is cut to demagnetize the iron core 81. Therefore, the closing lever 50 is rotated counterclockwise by the biasing force of the biasing member 51 adjusted as mentioned above, so that the trailing blade connected to the closing lever 50 moves toward the upper portion, thereby closing the opening 10a. When the closing lever 50 is rotated, the drive pin 58 abuts the rubber member 5a located at the terminal end position of the closing lever escape hole 5 to finish driving the closing lever 50. In this manner, the shutter operation is performed.

[Second Embodiment]

Figure 7:
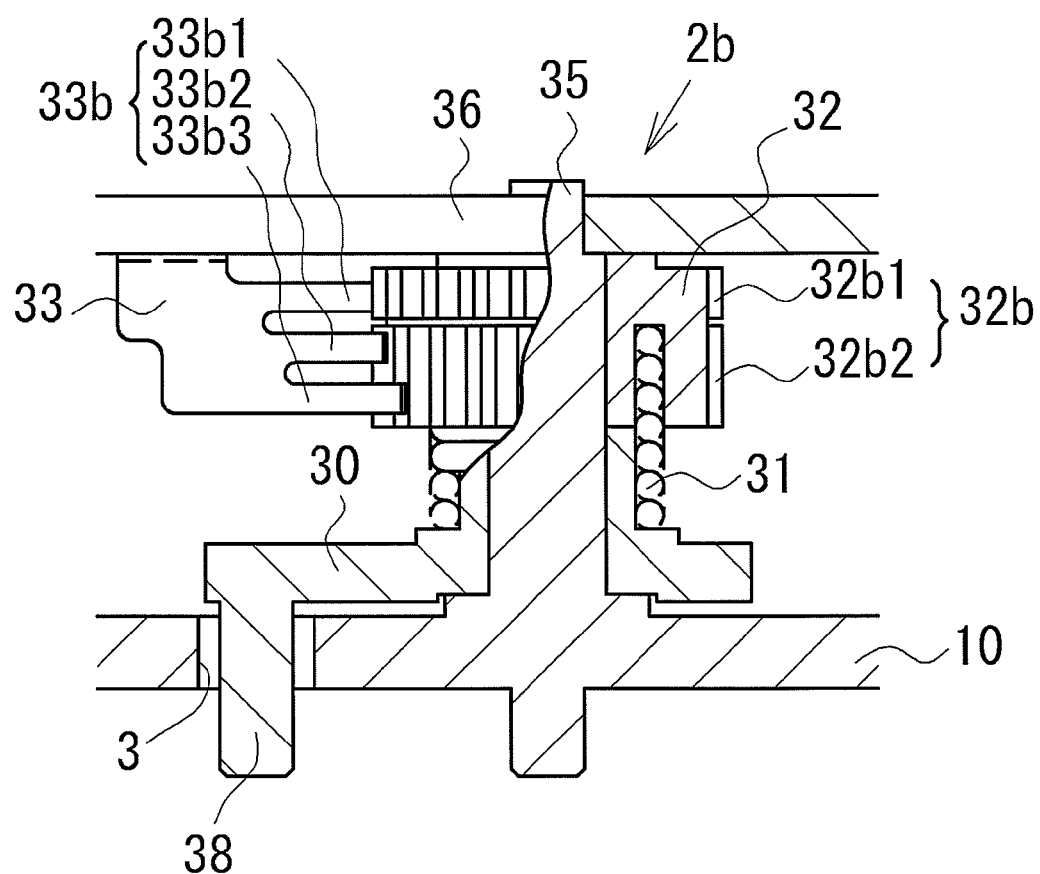
FIG. 7 is a side view of the blade speed adjustable mechanism according to a second embodiment.
Figure 8:
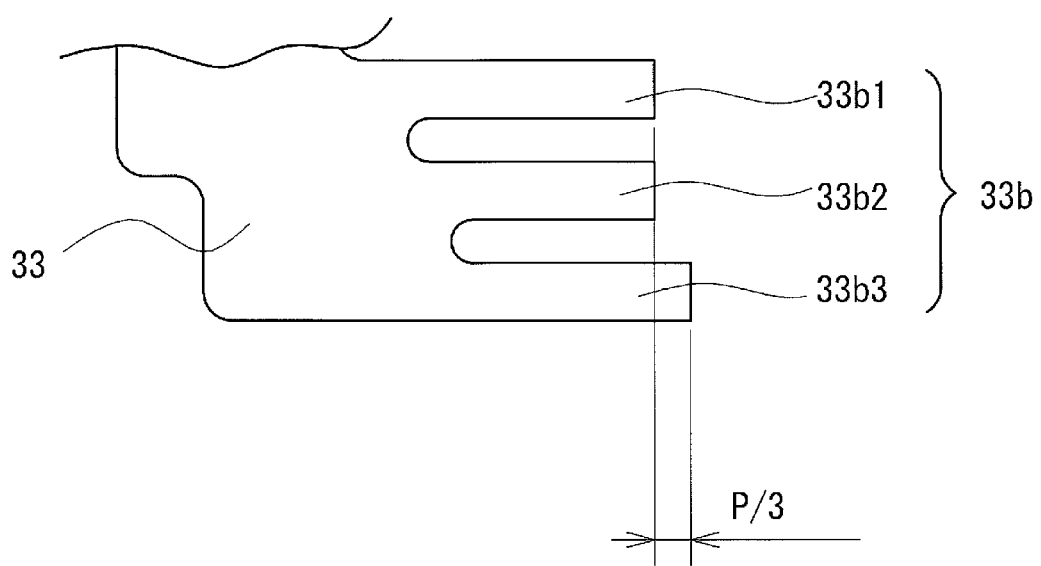
FIG. 8 is a partially enlarged view of the pawl portions of the engagement member according to a second embodiment.
Figure 9A:
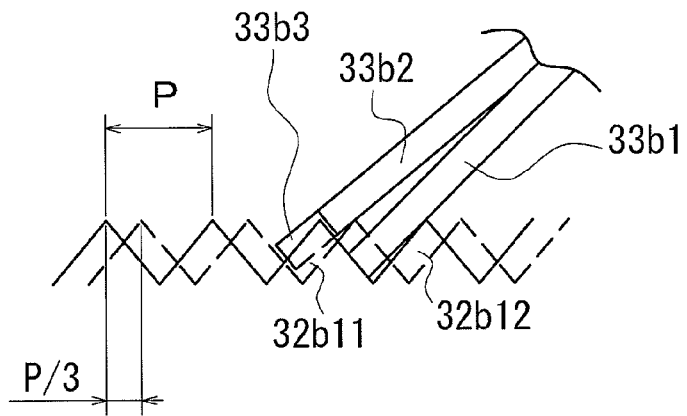
FIGS. 9A to 9C are schematic views of the engagement state between ratchet teeth of the ratchet member and pawl portions of the engagement member according to the second embodiment.
Figure 9B:
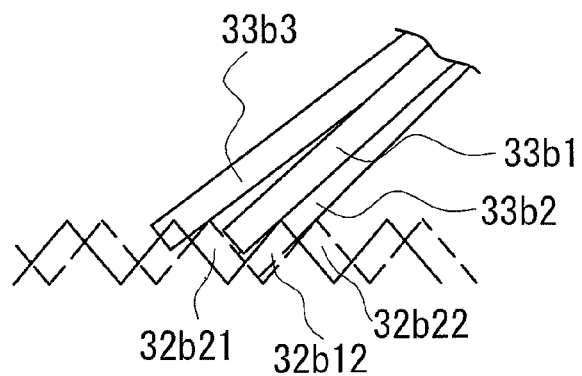
Figure 9C:
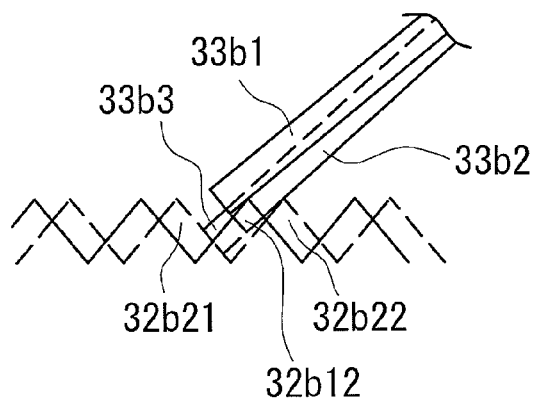

Next, a description will be given of a blade speed adjustable mechanism 2b according to the second embodiment. FIG. 7 is a side view of the blade speed adjustable mechanism 2b according to the second embodiment. FIG. 8 is a partially enlarged view of pawl portions 33b of the engagement member 33 in the blade speed adjustable mechanism 2b according to the second embodiment. FIGS. 9A to 9C are exemplary views of the engagement state between ratchet teeth 32b and pawl portions 33b. Additionally, in accordance with the embodiment to be described below, the same or similar elements of the blade speed adjustable mechanism 2a according to the first embodiment are designated with the same or similar reference numerals, and the duplicative description will be omitted. Moreover, likewise the first embodiment, the blade speed adjustment mechanism according to the present embodiment is also provided for adjusting the blade speed of the trailing blade 150, and its description will be omitted because its elements are same with the blade speed adjustable mechanism 2b for the leading blade 130.

Referring now to FIG. 7, plural ratchet teeth portions 32b1 and 32b2 are provided at the outer peripheral surface of the ratchet member 32, which is used in the blade speed adjustable mechanism 2b according to the second embodiment. The plural ratchet teeth portions 32b1 and 32b2 are integrally provided in the ratchet member 32 to be aligned in the direction of the rotational shaft 35. The phases of the teeth portions of the ratchet teeth portions 32b1 and 32b2 differ from each other by a distance corresponding to a one-third of the pitch. That is, the ratchet member 32 includes the plural ratchet teeth portions 32b1 and 32b2 which differ from each other in phase. Further, the engagement member 33 according to the present embodiment includes three pawl portions 33b1, 33b2, and 33b3, as illustrated in FIG. 8. Here, the pawl portions 33b1 and 33b2, serving as first pawl portions, are similar to each other in length. The pawl portions 33b1 and 33b2 respectively engage the plural ratchet teeth portions 32b1 and 32b2. Furthermore, the pawl portion 33b3, serving as a second pawl portion, has a length shorter than a pitch of the ratchet teeth portion 32b1. Specifically, the pawl portion 33b3 is longer than the pawl portion 33b1 or 33b2 by a length corresponding to a one-third of the pitch of the ratchet teeth portion 32b1.

Here, a description will be given, with reference to FIGS. 9A to 9C, of the engagement state between the pawl portions 33b and the ratchet teeth 32b according to the present embodiment. Likewise the first embodiment, a tooth portion 32b11 of the ratchet teeth 32b engages the pawl portion 33b1 of the engagement member 33, thereby restricting the clockwise rotation of the ratchet member 32 due to the biasing force of the biasing member 31 and holding the ratchet member 32 at a desired position. This engagement state is illustrated in FIG. 9A. Since the difference in the phase between the ratchet teeth portions 32b1 and 32b2 of the ratchet teeth 32b is a distance corresponding to a one-third of the pitch as illustrated in FIG. 9B, when the ratchet member 32 is rotated counterclockwise (the left-hand side in FIGS. 9A to 9C) from this state against the biasing force of the biasing member 31 by the distance corresponding to the one-third of the pitch of the tooth portion of the ratchet teeth 32b, a tooth portion 32b21 engages the pawl portion 33b2 to hold the ratchet member 32. A tooth portion 32b22 is adjacent to the tooth portion 32b21. When the ratchet member 32 is further rotated counterclockwise by the distance corresponding to the one-third of the pitch of the tooth portion of the ratchet teeth 32b, the tooth portion 32b21 engages the pawl portion 33b3 to hold the ratchet member 32 as illustrated in FIG. 9C. When the ratchet member 32 is further rotated counterclockwise by the distance corresponding to the one-third of the pitch of the tooth portion of the ratchet teeth 32b, a tooth portion 32b12 engages the pawl portion 33b1.

Additionally, in the present embodiment like the first embodiment, to increase the biasing force of the biasing member 31, the ratchet member 32 is rotated counterclockwise. In contrast, to decrease the biasing force of the biasing member 31, the ratchet member 32 is rotated clockwise. As mentioned above, the blade speed adjustable mechanism 2b according to the present embodiment changes the engagement state between the biasing member 31 and the ratchet member 32 by a resolution of one-third of the pitch of the teeth portion of the ratchet teeth 32b. That is, the attachment state of the other end of the coil spring as the biasing member 31 is changed, thereby adjusting the blade speed of the leading blade 130.

In this manner, the engagement member 33 of the blade speed adjustable mechanism 2b according to the second embodiment has the first pawl portions 33b1 and 33b2 and the second pawl portion 33b3 serving as plural pawl portions different from each other in length. The first and second pawl portions respectively engage the ratchet teeth portions 32b1 and 32b2, which differ from each other in phase, to hold the ratchet member at the stop position, thereby finely adjusting the biasing force of the biasing member 31. It is therefore possible to adjust the blade speed. Accordingly, it is possible to prevent the problem that the groove of the ratchet tooth engaging the pawl portion is made shallower and the ratchet member cannot be certainly held, in a case where the pitch of the ratchet teeth 32b is made smaller and the number of the adjustment positions is made to have the same number thereof without increasing the pawl portions of the engagement member 33. Further, as compared with a blade speed adjustment mechanism using a worm mechanism, the blade speed can be finely adjusted with reduced space and at low cost because the worm member is not used.

In addition to the above mentioned characteristics, in the blade speed adjustable mechanism 2b according to the second embodiment, the engagement member 33 has the pawl portions 33b1, 33b2, and 33b3. The pawl portions 33b1 and 33b2, serving as the first pawl portions, are similar to each other in length, and respectively engage the plural ratchet teeth portions 32b1 and 32b2. The pawl portion 33b3, serving the second pawl portion, differs from the first pawl portions in length. Here, the first and second pawl portions respectively engage the plural ratchet teeth portions 32b1 and 32b2, which differ from each other in phase, to hold the ratchet member 32 at a stop position, thereby finely adjusting the biasing force of the biasing member 31 and the blade speed. That is, in the conventional configuration having the plural ratchet teeth portions which differ from each other in phase, its resolution is the half pitch of the ratchet tooth portion. However, the resolution of one-third of the pitch of the tooth portion of the ratchet teeth 32b is achieved by use of two types of ratchet teeth portions, which differ from each other in phase, and by use of the first and second pawl portions, which differ from each other in length. Therefore, in a case where the number of the pawl portions of the engagement member is increased to engage each pawl portion with the plural ratchet teeth different from each other in phase, the resolution of the engagement positions can be improved without increasing the types of the ratchet teeth, thereby adjusting the stop position of the ratchet member 32 with accuracy. Moreover, the thickness of the ratchet teeth is prevented from being increased in the direction of rotational axis thereof. Further, as compared with a blade speed adjustment mechanism using a worm mechanism, the blade speed can be finely adjusted with reduced space and at low cost because the worm member is not used.

While the exemplary embodiments of the present invention have been illustrated in detail, the present invention is not limited to the above-mentioned embodiments, and other embodiments, variations and modifications may be made without departing from the scope of the present invention.

In the present embodiment, there has been described that the resolution of one-third of the pitch of the teeth portion of the ratchet teeth 32b is achieved by the engagement member 33. The engagement member 33 has the pawl portions 33b1, 33b2, and 33b3. The pawl portions 33b1 and 33b2, serving as the first pawl portions, are similar to each other in length and respectively engage the ratchet teeth portions 32b1 and 32b2 different from each other in phase. The pawl portion 33b3 serves as the second pawl portion, and differs from the first pawl portions in length. Likewise, the resolution of a onefourth of the pitch of the teeth portion of the ratchet teeth may be achieved by the engagement member which have three pawl portions and the second pawl portion, the three pawl portions serving as the first pawl portions engaging three types of ratchet teeth portions which different from each other in phase, the second pawl portion being different in length from the first pawl portions.

In the first embodiment, the ratchet member 32 may have ratchet teeth different from each other in phase. For example, the ratchet member 32 may have two ratchet teeth different from each other in phase by a distance corresponding to a given pitch. In this case, the pawl portions 33a1 and 33a2 respectively engage different ratchet teeth.

Finally, several aspects of the present invention are summarized as follows.

According to an aspect of the present invention, there is provided a blade speed adjustable mechanism of a focal plane shutter, the mechanism including: a board having an opening; a shutter blade opening or closing the opening; a drive lever supported by the board and bringing the shutter blade into an overlapped operation or an expanded operation; a biasing member engaging the drive lever and biasing the shutter blade in an overlapped direction or in an expanded direction; a ratchet member engaging the biasing member and having ratchet teeth; an engagement member holding the ratchet member at a desired stop position and adjusting an biasing force of the biasing member by changing the stop position, wherein: the engagement member has a plurality of pawl portions different from each other in length; the pawl portion engages the ratchet tooth to hold the ratchet member at the stop position; and a difference in length between the pawl portions is shorter than a distance corresponding to a pitch of the ratchet teeth.

With such a configuration of the blade speed adjustable mechanism, a shutter blade speed can be finely adjusted with certainty, and the small size of the shutter can be kept at low cost.

According to another aspect of the present invention, there is provided a blade speed adjustable mechanism of a focal plane shutter, the mechanism including: a board having an opening; a shutter blade opening or closing the opening; a drive lever supported by the board and bringing the shutter blade into an overlapped operation or in an expanded operation; a biasing member engaging the drive lever and biasing the shutter blade in an overlapped direction or in an expanded direction; a ratchet member engaging the biasing member and having a plurality of ratchet teeth different from each other in phase; an engagement member holding the ratchet member at a desired stop position and adjusting an biasing force of the biasing member by changing the stop position, wherein: the engagement member has a plurality of first pawl portions and a second pawl portion, the plurality of first pawl portions respectively engaging the plurality of ratchet teeth and being similar to each other in length, the second pawl portion being different from the first pawl portion in length; the first and second pawl portions engage the plurality of ratchet teeth to hold the ratchet member at the stop position; and a difference in length between the first and second pawl portions is shorter than a distance corresponding to a pitch of the ratchet teeth.

With such a configuration of the blade speed adjustable mechanism, a shutter blade speed can be finely adjusted with certainty, and the small size of the shutter can be kept at low cost.

According to another aspect of the present invention, there is provided a focal plane shutter including the above blade speed adjustable mechanism.

What is claimed is:

1. A blade speed adjustable mechanism of a focal plane shutter, the mechanism comprising:
   a board having an opening;
   a shutter blade opening or closing the opening;
   a drive lever supported by the board and bringing the shutter blade into an overlapped operation or an expanded operation;
   a biasing member engaging the drive lever and biasing the shutter blade in an overlapped direction or in an expanded direction;
   a ratchet member engaging the biasing member and having a plurality of ratchet teeth, wherein the plurality of ratchet teeth includes at least a first ratchet tooth and a second ratchet tooth, wherein a phase of the first ratchet tooth differs from a phase of the second ratchet tooth by a distance corresponding to one-third of a pitch of a tooth portion of the first ratchet tooth;
   an engagement member holding the ratchet member at a desired stop position and adjusting a biasing force of the biasing member by changing the stop position,
   wherein:
   the engagement member has a plurality of pawl portions different from each other in length;
   the plurality of pawl portions engage the plurality of ratchet teeth to hold the ratchet member at the stop position;
   a difference in length between the pawl portions is shorter than a distance corresponding to a pitch of the plurality ratchet teeth;
   the ratchet member rotates about an axis;
   the plurality of pawl portions is arranged in a direction of the axis, and is integrally formed in the engagement member.

2. The blade speed adjustable mechanism of the focal plane shutter of claim 1, wherein:
   the ratchet member has a plurality of the ratchet teeth different from each other in phase; and
   the pawl portions engaging the plurality of the ratchet teeth are different from each other in length.

3. A blade speed adjustable mechanism of a focal plane shutter, the mechanism comprising:
   a board having an opening;
   a shutter blade opening or closing the opening;
   a drive lever supported by the board and bringing the shutter blade into an overlapped operation or an expanded operation;
   a biasing member engaging the drive lever and biasing the shutter blade in an overlapped direction or in an expanded direction;
   a ratchet member engaging the biasing member and having a plurality of ratchet teeth having a plurality of different phases, wherein the plurality of ratchet teeth includes at least a first ratchet tooth and a second ratchet tooth, wherein a phase of the first ratchet tooth differs from a phase of the second ratchet tooth by a distance corresponding to one-third of a pitch of a tooth portion of the first ratchet tooth; and
   an engagement member holding the ratchet member at a desired stop position and adjusting a biasing force of the biasing member by changing the stop position,
   wherein:
   the engagement member has a plurality of first pawl portions and a second pawl portion, the plurality of first pawl portions respectively engaging the plurality of different phases of the plurality of ratchet teeth and being similar to each other in length, the second pawl portion being different from the first pawl portions in length;

the first and second pawl portions engage the plurality of ratchet teeth to hold the ratchet member at the stop position;

a difference in length between the first and second pawl portions is shorter than a distance corresponding to a pitch of the ratchet teeth;

the ratchet member rotates about an axis;

the first and second pawl portions are arranged in a direction of the axis, and are integrally formed in the engagement member;

the plurality of first pawl portions includes at least a first first pawl portion and a second first pawl portion; and the first first pawl portion, the second first pawl portion, and the second pawl portion are configured such that the first first pawl portion engages the first ratchet tooth when the second first pawl portion and the second pawl portion engage the second ratchet tooth.

4. A focal plane shutter comprising a blade speed adjustable mechanism, the mechanism including:
- a board having an opening;
- a shutter blade opening or closing the opening;
- a drive lever supported by the board and bringing the shutter blade into an overlapped operation or an expanded operation;
- a biasing member engaging the drive lever and biasing the shutter blade in an overlapped direction or in an expanded direction;
- a ratchet member engaging the biasing member and having a plurality of ratchet teeth having a plurality of different phases, wherein the plurality of ratchet teeth includes at least a first ratchet tooth and a second ratchet tooth, wherein a phase of the first ratchet tooth differs from a phase of the second ratchet tooth by a distance corresponding to one-third of a pitch of a tooth portion of the first ratchet tooth; and
- an engagement member holding the ratchet member at a desired stop position and adjusting a biasing force of the biasing member by changing the stop position, wherein:

the engagement member has a plurality of first pawl portions and a second pawl portion, the plurality of first pawl portions respectively engaging the plurality of different phases of the plurality of ratchet teeth and being similar to each other in length, the second pawl portion being different from the first pawl portions in length;

the first and second pawl portions engage the plurality of ratchet teeth to hold the ratchet member at the stop position;

a difference in length between the first and second pawl portions is shorter than a distance corresponding to a pitch of the ratchet teeth;

the ratchet member rotates about an axis;

the plurality of first pawl portions and the second pawl portion are arranged in a direction of the axis;

the plurality of first pawl portions and the second pawl portion are integrally formed in the engagement member;

the plurality of first pawl portions includes at least a first first pawl portion and a second first pawl portion; and the first first pawl portion, the second first pawl portion, and the second pawl portion are configured such that the first first pawl portion engages the first ratchet tooth when the second first pawl portion and the second pawl portion engage the second ratchet tooth.

* * * * *